US011758852B2

(12) United States Patent
Debbaut et al.

(10) Patent No.: US 11,758,852 B2
(45) Date of Patent: Sep. 19, 2023

(54) MONITORING BALE SHAPE

(71) Applicant: CNH Industrial America LLC, New Holland, PA (US)

(72) Inventors: Thomas Debbaut, Ronsele (BE); Kenny Nona, Linden (BE); Bruno Depraetere, Brasschaat (BE); Roeland De Geest, Kessel-Lo (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/836,333

(22) Filed: Jun. 9, 2022

(65) Prior Publication Data
US 2022/0400617 A1 Dec. 22, 2022

(30) Foreign Application Priority Data

Jun. 16, 2021 (EP) .................................... 21179790

(51) Int. Cl.
*A01F 15/08* (2006.01)
*A01F 15/04* (2006.01)
(52) U.S. Cl.
CPC .......... *A01F 15/0825* (2013.01); *A01F 15/04* (2013.01); *A01F 15/0875* (2013.01)
(58) Field of Classification Search
CPC .... A01F 15/04; A01F 15/042; A01F 15/0825; A01F 15/0875
See application file for complete search history.

(56) References Cited

U.S. PATENT DOCUMENTS

| | | |
|---|---|---|
| 6,708,478 B1 | 3/2004 | Mesmer et al. |
| 7,140,170 B2 | 11/2006 | Krone et al. |
| 7,937,923 B2 | 5/2011 | Biziorek |
| 8,200,399 B2* | 6/2012 | Madsen ................. A01F 15/08 56/10.2 R |
| 10,098,283 B2 | 10/2018 | Coen et al. |
| 10,412,898 B2 | 9/2019 | Coen et al. |
| 10,455,769 B2 | 10/2019 | Maelfeyt et al. |
| 2013/0112094 A1* | 5/2013 | Smith ..................... A01F 15/08 100/99 |
| 2017/0027101 A1* | 2/2017 | Wilkening .......... A01F 15/0833 |

FOREIGN PATENT DOCUMENTS

| | | |
|---|---|---|
| EP | 0573342 A1 | 12/1993 |
| EP | 2656726 A1 | 10/2013 |

OTHER PUBLICATIONS

Extended European Search Report for EP Application No. 21179790.7 dated Dec. 3, 2021 (9 pages).

* cited by examiner

*Primary Examiner* — Jimmy T Nguyen
(74) *Attorney, Agent, or Firm* — Peter Zacharias

(57) ABSTRACT

A method and system for monitoring a bale shape. The method includes receiving a series of bale images from a camera, identifying the bale in the bale images, determining at least one bale shape parameter of the identified bale, and providing an electronic signal representative of the bale shape parameter. The bale images include a view of at least an outlet of a bale chamber of an agricultural baler, of a bale being ejected from the outlet, and of a field travelled by the agricultural baler during the ejection of the bale. The at least one bale shape parameter of the identified bale is then determined based on at least one of the bale images. The identifying of the bale may, at least partly, be performed using trained neural networks and other artificial intelligence algorithms.

13 Claims, 4 Drawing Sheets

210

MONITORING BALE SHAPE

TECHNICAL FIELD

The present invention relates to a method and system for monitoring bale shape in an agricultural baler and to an agricultural baler comprising a bale shape monitoring system.

BACKGROUND

Agricultural balers are used to consolidate and package crop material so as to facilitate the storage and handling of the crop material for later use. For example, when the crop is hay a mower-conditioner is typically used to cut and condition the crop material for windrow drying in the sun. As another example, when the crop is straw a combine harvester discharges non-grain crop material from the rear of the harvester defining the straw which is to be picked up by the baler. The cut crop material is usually dried, and a baler, such as a large square baler or round baler, straddles the windrows and travels along the windrows to pick up the crop material and form it into bales.

A large square baler typically comprise two main parts used in the formation of the bales, being a pre-compression chamber and a bale chamber. Crop material is gathered and pushed into the pre-compression chamber, where a slice of crop material is formed. The pre-compression chamber is linked to the bale chamber in such a manner that the slice of crop material is periodically transferred into the bale chamber. In the bale chamber, a plunger reciprocally moves, thereby pressing a square bale from subsequently fed slices.

When the bale is completed, a piece of twine is wrapped around the bale and tied to keep the bale together. While a new bale is formed in the bale chamber, the completed bale is pushed to the rear of the bale chamber by this new bale. Eventually, the completed bale is pushed through an outlet at the rear of the bale chamber and dropped on the field behind the agricultural baler.

In practice, not all bales come out the same. A length of the bale is determined by the number of slices that is used to form a bale, but also influenced by, e.g., crop type, crop humidity, and the filling level of the pre-compression chamber when the crop slices are transferred into the bale chamber. If the filling of the pre-compression chamber varies per slice and/or if the gathered crop is not evenly distributed over the width of the pre-compression chamber, the shape of the resulting bale may deviate from a perfect rectangular box.

Different systems for measuring the length of a square bale have been described and used in the past. Commonly, a measuring wheel is configured to rotate when the bale is pushed through the bale chamber and a sensor measures the rotation of the measuring wheel. Alternatively, a sensor may measure the amount of twine that is needed to wrap the completed bale and a bale length is calculated based on the required amount of twine. In, e.g., U.S. Pat. No. 10,098,283, an optical sensor is mounted to the bale chamber wall for measuring the movement of the bale through the bale chamber and for deriving the total bale length therefrom. All these known methods for determining the bale length have their own inaccuracies and share the disadvantage that the bale length measurement is based on measurements made while the bale is still being formed and its size and shape are at least partly confined by the external pressure of the bale chamber walls.

It is an aim of the present invention to address one or more disadvantages associated with the prior art.

SUMMARY OF THE INVENTION

According to an aspect of the invention there is provided a new method for monitoring bale shape. This new method comprises the steps of receiving a series of bale images from a camera, identifying the bale in the bale images, determining at least one bale shape parameter of the identified bale, and providing an electronic signal representative of the bale shape parameter. The bale images comprise a view of at least an outlet of a bale chamber of an agricultural baler, of a bale being ejected from the outlet, and of a field travelled by the agricultural baler during the ejection of the bale. The at least one bale shape parameter of the identified bale is then determined based on at least one of the bale images.

The method according to the invention provides for an easy way to determine the bale length when the bale has already been ejected from the bale chamber, just before it is dropped on the field. By including the view of at least the outlet of the bale chamber in the bale images, it is made possible to use the known dimensions and orientations of parts of the agricultural baler as a reference for determining the bale shape parameters that are derived from the captured images. When capturing the bale images during and just after the ejection of the bale from the outlet, the bale images show images of the bale when free of external pressure from the bale chamber walls. The bale can thus obtain its eventual shape before the at least one bale shape parameter is determined. This allows for a more accurate measurement of relevant bale shape parameters that better reflects the shape and dimensions of the bale as it is eventually left behind on the field. In addition to more accurate information about the produced bales, this allows for improved control of the operation of the agricultural baler in dependence of the observed shape of the bales that are produced.

Standard image processing techniques for identifying objects in images use edge detection and pattern recognition algorithms to separate the object from the background and recognize the object to be identified. In an embodiment of the invention, the identifying of the bale in the bale images comprises distinguishing the bale from the field based on an observed difference in displacement relative to the agricultural baler and between different bale images of the series. During use, the agricultural baler drives over the field, causing a displacement of the field relative to the agricultural baler between subsequent images of the series. The bale is carried by and generally travels at the same speed as the agricultural baler. Only when the plunger pushes against the bale (about once per second), the bale is displaced relative to the agricultural baler. According to this embodiment of the invention, the continuous and larger displacement of the field relative to the agricultural baler is distinguished from the periodic and smaller displacement of the bale, thereby improving the detection algorithm for identifying the bale.

The at least one bale shape parameter that is determined may comprise a bale length, a bale volume and/or a bale rectangularity of the identified bale. The latter may, e.g., be determined by fitting the identified bale to a quadrilateral bounding box. The rectangularity of the identified bale can then, e.g., be determined by counting pixels that are part of the bale but not of the bounding box, or vice versa. Optionally, the bale images further comprise a view of a reference part of the agricultural baler, and the at least one lateral edge of the quadrilateral bounding box is aligned with the reference part. When the exact orientation of the reference part is known, this knowledge can be used to ensure that the quadrilateral bounding box in the image represents an actual rectangle in 3D. Alternatively, stereo cameras may be used for determining a rectangularity of the bale.

In a preferred embodiment, the method further includes identifying a movable top door of the bale chamber and, based on at least one of the bale images, determining a position of the top door relative to a reference point on the agricultural baler. The movable top door of the bale chamber applies pressure to the top of the bale. If the pre-compression chamber is not filled to full capacity before new slices are fed into the bale chamber, the top door can push down further than when it is completely filled. When the filling level of the pre-compression chamber varies for subsequent slices of a single bale, an irregularly shaped bale may be the result. When capturing images of the bale from a top perspective view, such irregularity may not be easy to identify. By monitoring the position of the top door relative to the reference point while the bale is being formed, the average and varying height of the bale can be determined, and additional bale shape information is obtained.

In a preferred embodiment, the method for monitoring bale shape further comprises determining, based on at least two of the bale images, an extent of movement of the bale relative to the agricultural baler. As explained above, the bale normally only moves relative to the agricultural baler when it is pushed by the plunger. If, e.g., 50 bale images are captured per second and plunger strokes come at a rate of 1 per second, most images will show the bale in the same position as the immediately preceding images of the series. By monitoring the extent of movement of the bale relative to the agricultural baler between different images of the series, it can be determined if (and how much) the bale is moved in between plunger strokes. When the bale is found to continue moving when not in contact with the plunger, this is a clear sign that the bale is not properly clamped in the bale chamber. This problem can possibly be solved by adjusting one or more operational parameters of the agricultural baler.

In an advanced embodiment of the method for monitoring bale shape, trained neural networks and/or other artificial intelligence (AI) algorithms are used to identify the bale in the bale images. For example, training data sets may be provided by labelling bales in a plurality of bale images comprising a view of a bale against the background of a field. The labelling may, e.g., be performed by hand or using the bale identifying algorithm described above.

According to a further aspect of the invention, a computer program is provided comprising instructions which, when executed by a computer, cause the computer to carry out a method as described above.

According to a further aspect of the invention, a system is provided for monitoring bale shape in an agricultural baler. The system comprises a camera for capturing a series of bale images, and a controller, operatively coupled to the camera and configured to perform a method as described above.

According to yet a further aspect of the invention, an agricultural baler is provided comprising a bale chamber for forming a bale therein, the bale chamber comprising an outlet for ejection of the bale from the bale chamber. The agricultural baler further comprises a camera positioned to capture a series of bale images, the bale images comprising a view of the outlet, a view of the bale while being ejected from the outlet, and a view of a field travelled by the agricultural baler during the ejection of the bale. A controller is operatively coupled to the camera for receiving the series of bale images therefrom and suitable for performing a method as described above. The agricultural baler may be a large square baler.

BRIEF DESCRIPTION OF THE DRAWINGS

Embodiments of the invention will now be described by way of example with reference to the accompanying drawings.

DETAILED DESCRIPTION

Figure 1:
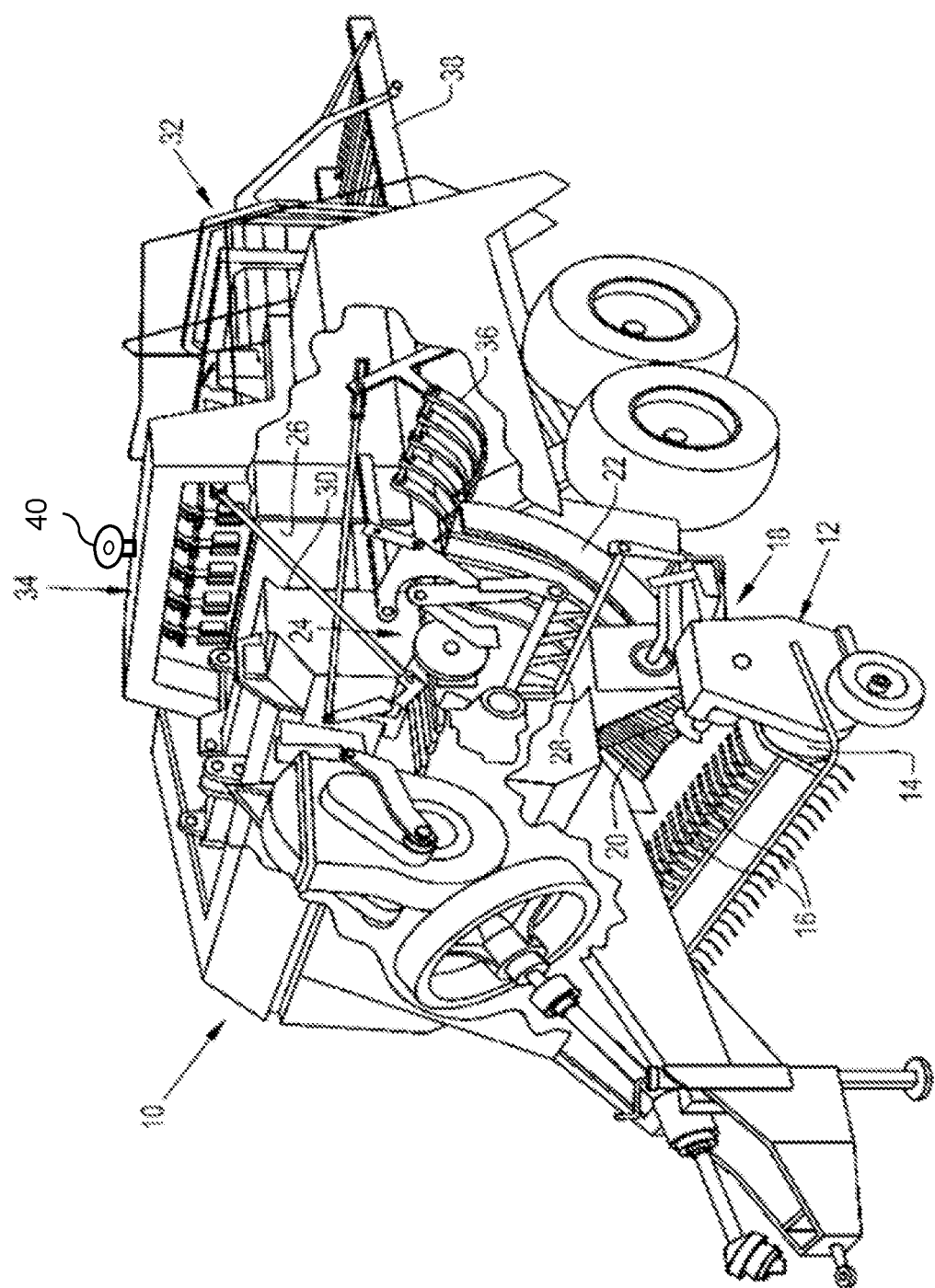
FIG. 1 shows a perspective cutaway view of an agricultural baler wherein the invention may be used.

FIG. 1 shows an agricultural baler 10 in the form of a large square baler. The baler 10 has a pickup unit or apparatus 12 for lifting crop material from windrows. The pickup apparatus 12 has a rotatable pickup roll (or rotor or cylinder) 14 with a plurality of pickup tines 16 to move the collected crop rearward towards a rotor cutter apparatus 18. Optionally, a pair of stub augers (one of which is shown, but not numbered) is positioned above the pickup roll 14 to move the crop material laterally inward.

The rotor cutter apparatus 18 has a rotor assembly with rotor tines 20 that push the crop towards a knife rack with knives for cutting the crop and into a pre-compression chamber 22 to form a slice of crop material. The tines 20 intertwine the crop together and pack the crop within the pre-compression chamber 22. The pre-compression chamber 22 and the rotor assembly with the tines 20 function as a first stage for crop compression.

Once the pressure in the pre-compression chamber 22 reaches a predetermined sensed value, a stuffer unit or apparatus 24 moves the slice of crop from the pre-compression chamber 22 to a bale chamber 26. The stuffer apparatus 24 includes stuffer forks 28 which push the slice of crop directly in front of a plunger 30, which reciprocates within the bale chamber 26 and compresses the slice of crop into a flake. The stuffer forks 28 return to their original state after the slice of material has been moved into the bale chamber 26. The plunger 30 compresses the slices of crop into flakes to form a bale and, at the same time, gradually advances the bale toward an outlet 32 of the bale chamber 26. The bale chamber 26 and plunger 30 function as a second stage for crop compression.

When enough flakes have been added and the bale reaches a full (or other predetermined) size, the knotters 34 are actuated which wrap and tie twine around the bale while it is still in the bale chamber. Needles 36 bring the lower twine up to the knotters 34 and the tying process then takes place. The twine is cut, and the formed bale is ejected from a discharge chute 38 as a new bale is formed.

Figure 2:
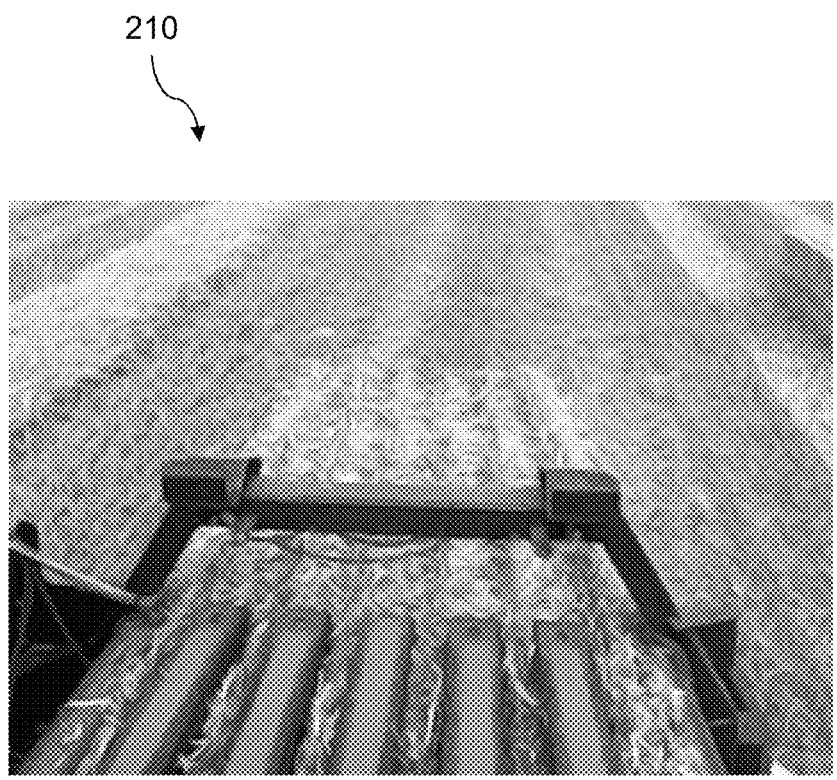
FIG. 2 shows an exemplary bale image captured by a camera of an embodiment of a system according to the invention.

A camera 40 is installed on the agricultural baler 10 at a position and orientation that allows it to capture a series of bale images comprising a view of the outlet 32 of the bale chamber 26 and the bale that is ejected therefrom. In the background of the captured images, a portion of the agricultural field that is being traversed will be visible too. An example of one of the images 210 of such a series is shown in FIG. 2. The camera may be a standard 2D monochrome or multi-color digital camera for capturing photos and/or video. More than one camera may be used for capturing images from different viewpoints, thereby increasing the accuracy with which bales can be identified and their exact 3D shape determined. Alternatively, the camera may be a stereo camera, a laser scanner, radar, or other type of 3D camera. In the following, an embodiment of the invention will be described, based on the use of a single monochrome or multi-color 2D digital camera. It should, however, be clear that the invention is not limited to this embodiment.

Figure 3:
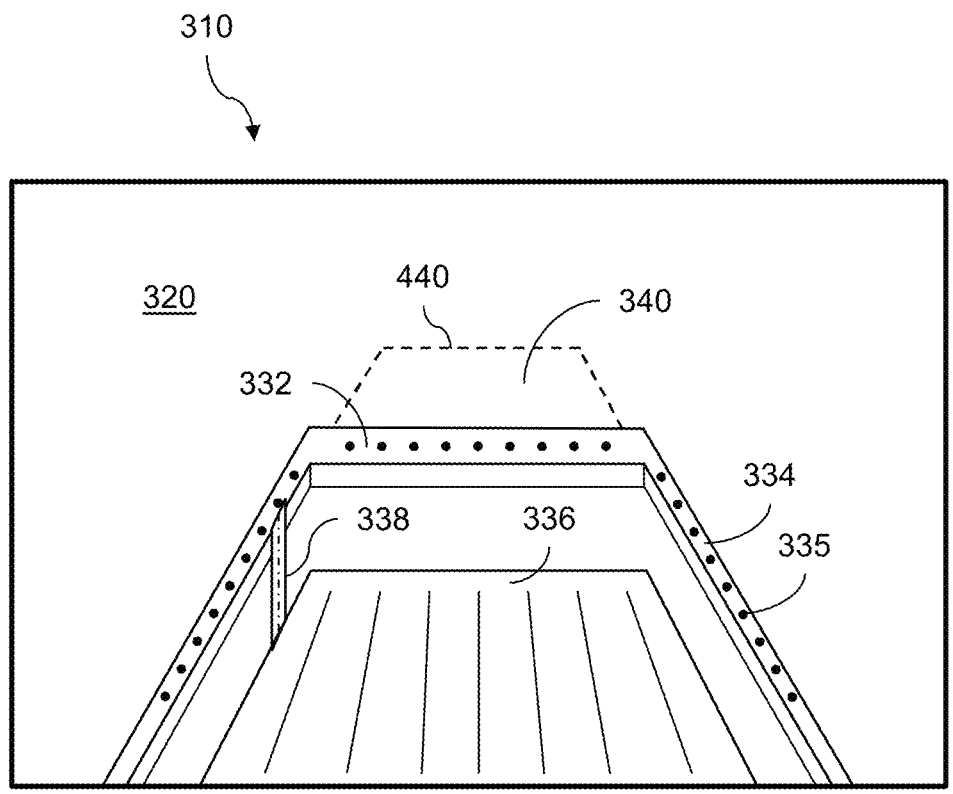
FIG. 3 shows a schematic representation of a bale image as shown in FIG. 2.

FIG. 2 shows an exemplary bale image 210 captured by a camera 40 of an embodiment of a system according to the invention. FIG. 3 shows a schematic representation 310 of a bale image 210 as shown in FIG. 2. The bale image 210 shown in FIG. 2 is just one of a series of images captured and processed in accordance with a method according to the invention. Typically, the camera 40 captures about 50 bale images per second. Higher capture rates and higher image resolutions can help to improve the accuracy with which the bales are identified and their exact dimensions in 3D are determined. However, higher capture rates and image resolutions also require more processing power and processing time. In practice, a balance needs to be found between cost and detection accuracy, while allowing the system to analyzes the images in real time. Efficient and effective image processing algorithms can thereby assist to increase detection accuracy without increasing the required amount of processing power and time.

As can be seen in FIG. 2, the agricultural baler 10 itself is easily discernible and clearly stands out from the other parts of the image 210. The bale on the discharge chute 38 and the agricultural field in the background, however, have very similar color and texture and are difficult to distinguish. This lack of contrast between the bale and the background may not just be a problem for a human observer looking at the image, but also makes it difficult for standard image recognition algorithms to identify the bale and accurately determine its exact shape.

According to an embodiment of the invention, the bale 340 may be identified in the bale images 210, 310 by determining and comparing a displacement of specific pixels or groups of pixels in the image 210, 310 between subsequent images of the series. During use, the agricultural baler 10 drives over the field 320, causing a displacement of the field 320 relative to the agricultural baler 10 between subsequent images of the series. The bale 340 is carried by and generally travels at the same speed as the agricultural baler 10. Only when the plunger 30 pushes against the bale 340 (about once per second), the bale 340 is displaced relative to the agricultural baler 10. In the bale images 210, 310, the bale chamber outlet 332 and some other parts of the agricultural baler 10, such as a bale chamber frame 334 and a bale chamber top door 336 may be visible. The bale chamber outlet 332 and bale chamber frame 334 keep in a constant position relative to the camera 40 and do not show any displacement between different images 210, 310 in the series of bale images.

The observed difference in displacement between the bale 340 and the field 320 relative to the agricultural baler 10 may be used to distinguish the pixels and groups of pixels in the bale images 210, 310 that represent the bale 340 and the field 320.

Alternatively, trained neural networks and/or other artificial intelligence (AI) algorithms are used to identify the bale 340 in the bale images 210, 310. For example, training data sets may be provided by labelling bales 340 in a plurality of bale images 210, 310 comprising a view of a bale 340 against the background of a field 320. The labelling may, e.g., be performed by hand or using the above described bale identifying algorithm based on the difference in displacement relative to the agricultural baler 10.

When the bale 340 is identified in the bale images 210, 310, the shape and dimensions of the bale 340 can be derived from those bale images too. Exemplary bale shape parameters that may be derivable from these bale images 210, 310 are a bale length, a bale volume and/or a bale rectangularity of the identified bale.

Preferably, such bale shape parameters are derived from bale images 210, 310 that show a complete top surface of the bale 340. The complete top surface of the bale 340 is best visible in the period after the complete bale 340 has been ejected from the bale chamber outlet 332 and before it tips over the rear end of the bale chute 38 and is dropped onto the field 320. Alternatively, for example if the rear end of the bale 340 is already visible before the bale has been fully ejected, the bale shape parameters may be derived from an image wherein a small portion of the top surface is hidden from view by the outlet 332.

The viewing angle of the camera 40 on the top surface of the bale and general perspective distortion resulting from the choice of imaging equipment make it difficult to directly derive the relevant bale shape parameters from the bale images. Reference parts of the agricultural baler 10 may be identified in the same bale images 310 and used as a reference to allow a more accurate measurement of the bale shape parameters. For example, the bale chamber outlet 332 and the bale chamber frame 334 have known dimensions and a fixed orientation and are very suitable to function as a reference part. Additional markers 335 may be applied to such reference parts to further facilitate the bale shape parameter measurements.

Optionally, the images further show at least a portion of the movable top door 336 of the bale chamber and the position of the top door 336 is monitored while the bale 340 is being formed. During the formation of the bale, the movable top door 336 of the bale chamber applies pressure to the top of the bale 340. If the pre-compression chamber is not filled to full capacity before new slices are fed into the bale chamber, the top door 336 can push down further than when it is completely filled. When the filling level of the pre-compression chamber varies for subsequent slices of a single bale 340, an irregularly shaped bale 340 may be the result. When capturing images 210, 310 of the bale 340 from a top perspective view, such irregularity may not be easy to identify. By monitoring the position of the top door 336 relative to a reference point 338 while the bale 340 is being formed, the average and varying height of the bale 340 can be determined, and additional bale shape information is obtained. As shown in FIG. 3, the reference point may be embodied as reference part 338 with vertically arranged markers.

In order to accurately determine one or more bale shape parameters, the processing of the bale images may comprise fitting the identified bale 340 to a quadrilateral bounding box 440. As can be seen in FIG. 3, the quadrilateral bounding box 440 will generally not be rectangular in the bale image 210, 310. However, knowing that the bale 340 is supposed to be rectangular, and possibly making use of the reference parts 334, 332 visible in the bale image 310, a geometric transformation may be used to transform the quadrilateral bounding box 440 into a rectangular shape. The bale 340 identified in the image is then transformed accordingly.

Figure 4:
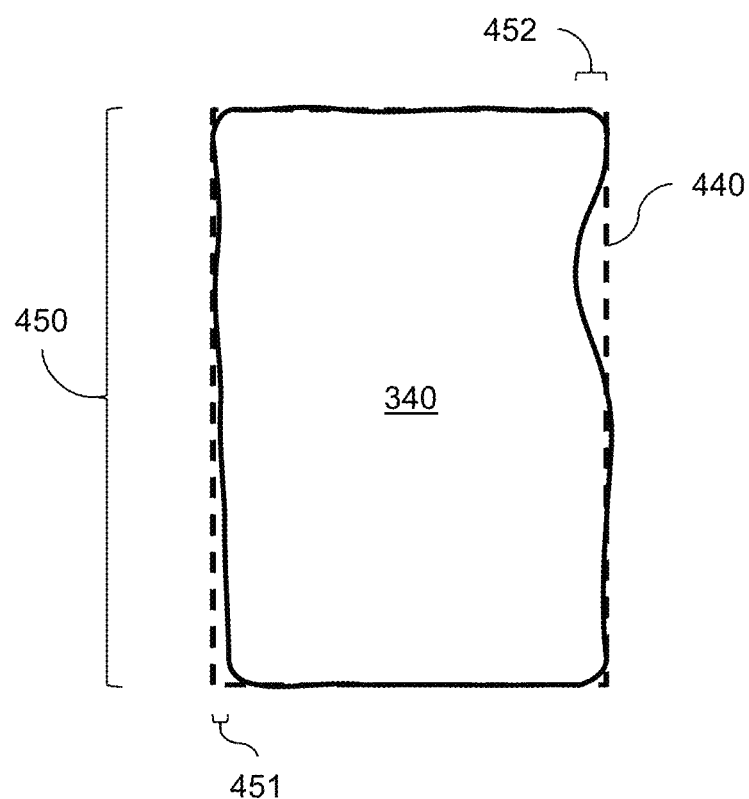
FIG. 4 shows a top view of a bale that may be analyzed using an embodiment of a system according to the invention.

A possible result of such transformations can be seen in FIG. 4 which, in fact, shows a reconstructed top view of a bale identified in one of the bale images 210, 310. In this top view, some of the available bale shape parameters are identified. A bale length 450 is defined by a distance between the leading and the trailing edge of the bale 340. The rectangularity of the identified bale 340 may, e.g., be determined by counting pixels that are inside the bounding box 440 but do not form part of the bale 340. A different measure of (non-)rectangularity may be a skew parameter 451, defining how far one of the corners of the top surface is displaced from the corresponding corner of the bounding box 440. An indent parameter 452 may indicate the largest distance of any edge of the top surface to the corresponding edge of the bounding box 440. Other useful parameters for classifying the shape or rectangularity of the bale 340 may be used.

In addition to measuring bale shape parameters, the bale shape monitoring system may be configured to check if the bale 340 in the bale chamber 26 is properly clamped between the bale chamber walls. This may be done by determining an extent of movement of the bale 340 relative to the agricultural baler 10 between two consecutive images of the series of bale images 210, 310. As explained above, the bale 340 normally only moves relative to the agricultural baler 10 when it is pushed by the plunger 30. If, e.g., 50 bale images are captured per second and plunger strokes come at a rate of 1 per second, most bale images 210, 310 will show the bale 340 in the same position as the immediately preceding images 210, 310 in the series. By monitoring the extent of movement of the bale 340 relative to the agricultural baler 10 between different images 210, 310 in the series, it can be determined if (and how much) the bale 340 is moved in between two plunger strokes. When the bale 340 is found to continue moving when not in contact with the plunger 30, this is a clear sign that the bale 340 is not properly clamped in the bale chamber 26. This problem can possibly be solved by adjusting one or more operational parameters of the agricultural baler.

Additional bale measurement systems and methods may be used for calibrating the bale shape monitoring system of the invention. For example, bale shape parameters obtained with this new system and method may be compared to a calibration measurement made on a bale that has already been dropped on the field. The calibration measurement may then be performed with, for example, a simple tape measure or advanced laser equipment. Alternatively, the agricultural baler 10 comprises a second system for measuring at least one of the bale shape parameters, thereby allowing for continuous calibration of one or both measurement systems during operation of the agricultural baler 10. Such a second bale shape measuring system may, for example, comprise a measuring wheel or other measuring system as described in the background art section above.

The invention claimed is:

1. A method for monitoring bale shape, the method comprising steps of:
   receiving a series of bale images from a camera, the bale images comprising:
     a view of at least an outlet of a bale chamber of an agricultural baler;
     a view of a bale being ejected from the outlet; and
     a view of a field travelled by the agricultural baler during the ejection of the bale from the outlet,
   identifying the bale in the bale images;
   based on at least one of the bale images, determining at least one bale shape parameter of the identified bale;
   providing an electronic signal representative of the at least one bale shape parameter; and
   fitting the identified bale to a quadrilateral bounding box to determine the at least one shape parameter.

2. The method for monitoring bale shape according to claim 1, wherein the identifying of the bale in the bale images comprises distinguishing the bale from the field based on an observed difference in displacement relative to the agricultural baler and between different bale images of the series.

3. The method for monitoring bale shape according to claim 1, wherein the at least one bale shape parameter comprises a bale length of the identified bale.

4. The method for monitoring bale shape according to claim 1, wherein the at least one bale shape parameter comprises a bale rectangularity of the identified bale.

5. The method for monitoring bale shape according to claim 4, wherein the fitting of the identified bale to the quadrilateral bounding box is to determine the bale rectangularity.

6. The method for monitoring bale shape according to claim 5, wherein the bale images further comprise a view of a reference part of the agricultural baler, and wherein at least one lateral edge of the quadrilateral bounding box is aligned with the reference part.

7. The method for monitoring bale shape according to claim 1, wherein the bale shape parameter represents a bale volume of the identified bale.

8. The method for monitoring bale shape according to claim 1, further comprising identifying a movable top door of the bale chamber and, based on at least one of the bale images, determining a position of the top door relative to a reference point on the agricultural baler.

9. The method for monitoring bale shape according to claim 1, further comprising determining, based on at least two of the bale images, an extent of movement of the bale relative to the agricultural baler.

10. The method for monitoring bale shape according to claim 1, wherein the identifying the bale in the bale images comprises identifying the bale in the bale images using trained neural networks or other artificial intelligence algorithms.

11. A system for monitoring bale shape in an agricultural baler, the system comprising:
   a camera for capturing a series of bale images, the bale image comprising:
     a view of at least an outlet of a bale chamber of the agricultural baler,
     a view of a bale being ejected from the outlet, and
     a view of a field travelled by the agricultural baler during the ejection of the bale from the outlet; and
   a controller operatively coupled to the camera, wherein the controller is configured to:
     receive the series of bale images from the camera,
     identify the bale in the bale images,
     determine at least one bale shape parameter of the identified bale based on at least one of the bale images,
     provide an electronic signal representative of the at least one bale shape parameter, and
     fit the identified bale to a quadrilateral bounding box for determining the at least one bale shape parameter.

12. An agricultural baler comprising:
   a bale chamber for forming a bale therein, the bale chamber comprising an outlet for ejection of the bale from the bale chamber;
   a camera positioned to capture a series of bale images, the bale images comprising:
     a view of the outlet;

a view of the bale while being ejected from the outlet; and a view of a field travelled by the agricultural baler during the ejection of the bale from the outlet;

a controller operatively coupled to the camera, wherein the controller is configured for:

receiving the series of bale images from the camera;

identifying the bale in the bale images;

based on at least one of the bale images, determining at least one bale shape parameter of the identified bale;

providing an electronic signal representative of the at least one bale shape parameter; and fitting the identified bale to a quadrilateral bounding box for determining the at least one bale shape parameter.

13. The agricultural baler as claimed in claim 12, wherein the agricultural baler is a large square baler.

* * * * *